(12) United States Patent
Cuesta Garcia

(10) Patent No.: US 11,980,525 B2
(45) Date of Patent: May 14, 2024

(54) DUAL FIXATION SYSTEM FOR PROSTHESIS ON DENTAL IMPLANTS THAT ALLOWS THE PROSTHESIS TO BE SCREWED OR CLIP RETAINED AS APPROPRIATE

(71) Applicant: Julian Cuesta Garcia, Barcelona (ES)

(72) Inventor: Julian Cuesta Garcia, Barcelona (ES)

(73) Assignee: Julian Cuesta Garcia, Barcelona (ES)

( * ) Notice: Subject to any disclaimer, the term of this patent is extended or adjusted under 35 U.S.C. 154(b) by 531 days.

(21) Appl. No.: 16/771,078

(22) PCT Filed: Dec. 3, 2018

(86) PCT No.: PCT/ES2018/000087
§ 371 (c)(1),
(2) Date: Jun. 9, 2020

(87) PCT Pub. No.: WO2019/115846
PCT Pub. Date: Jun. 20, 2019

(65) Prior Publication Data
US 2021/0186666 A1 Jun. 24, 2021

(30) Foreign Application Priority Data
Dec. 12, 2017 (ES) .............................. ES201700799

(51) Int. Cl.
*A61C 8/00* (2006.01)
(52) U.S. Cl.
CPC .......... *A61C 8/0069* (2013.01); *A61C 8/0012* (2013.01); *A61C 8/0018* (2013.01); *A61C 8/0066* (2013.01)

(58) Field of Classification Search
CPC ... A61C 8/0062; A61C 8/0068; A61C 8/0098; A61C 8/0078; A61C 8/006; A61C 8/0069; A61C 8/0001; A61C 2008/0084
See application file for complete search history.

(56) References Cited

U.S. PATENT DOCUMENTS 9,827,074 B2 * 11/2017 Allen ................... A61C 8/0068
2008/0153059 A1   6/2008 Schaffran et al.
(Continued)

FOREIGN PATENT DOCUMENTS

WO   WO-2019078818 A1 * 4/2019 ........... A61C 8/0048

OTHER PUBLICATIONS

International Search Report for PCT/ES2018/00087, dated Mar. 6, 2019.

*Primary Examiner* — Jan Christopher L Merene
*Assistant Examiner* — Luis M Ruiz Martin
(74) *Attorney, Agent, or Firm* — Calderone McKay LLC

(57) ABSTRACT

The invention relates to a dual fixation system for dental implant prosthesis consisting of: an intermediate abutment assembly for fixation on the implant, clip fixation device, fixation screw and cylinder that allows the prosthesis to be screwed or retained by clip as appropriate, individually or independently for each implant.
This system facilitates both the immediate loading technique and the execution of the definitive prosthesis made on an intermediate abutment, since retention by clip is very advantageous in the case of implants with unfavorable emergencies, joining them to the structure as abutments and without compromising the esthetics of the case.

7 Claims, 7 Drawing Sheets

(56) References Cited

U.S. PATENT DOCUMENTS

2009/0130629 A1* 5/2009 Towse .................... A61C 8/005
            433/174
2014/0045145 A1* 2/2014 Buchegger ........... A61C 8/0068
            433/201.1

* cited by examiner

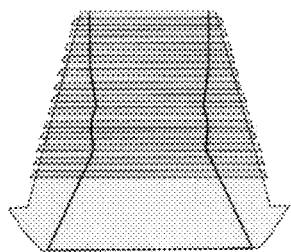
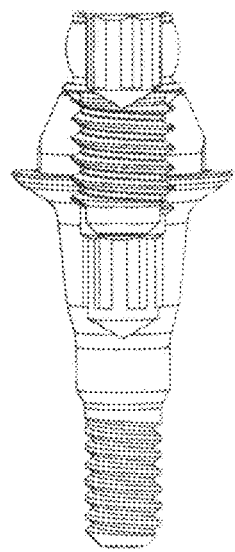
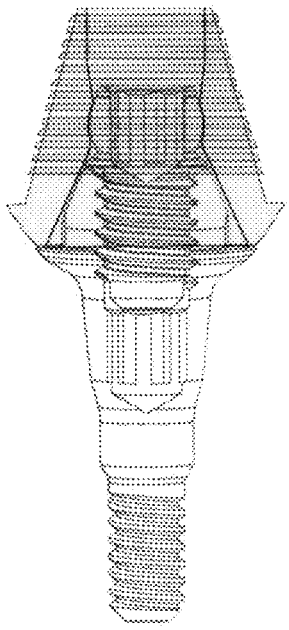
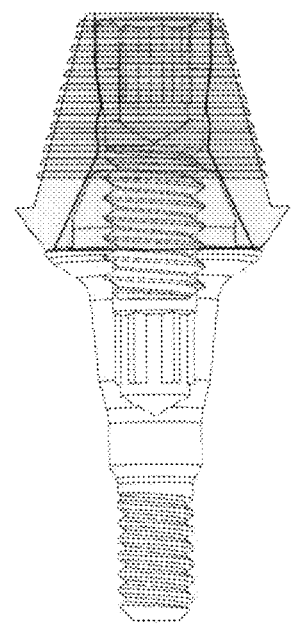
FIG 20　　　　　　FIG 21　　　　　　FIG 22

DUAL FIXATION SYSTEM FOR PROSTHESIS ON DENTAL IMPLANTS THAT ALLOWS THE PROSTHESIS TO BE SCREWED OR CLIP RETAINED AS APPROPRIATE

FIELD OF TECHNOLOGY

The present invention refers to a prosthetic device that goes on an abutment of a dental implant. It belongs to the field of oral implantology.

BACKGROUND TO THE INVENTION

Immediate loading procedures are increasingly common in today's implant practice.

Patients frequently demand to leave the office with a transitional prosthesis supported by the implants that have just been placed.

There are currently two common retention systems for this type of prosthesis:
  Cementation technique on the abutment directly to the implant.
  Screwing technique on intermediate abutment through the crown.

The present invention opens a new way, that of clip retention, because the new cylinder can be screwed from above but also clip retained from below.

When it comes to restoring single crowns, the best system is cement-screw retained direct to the implant, without an intermediate abutment. In other words, the crown is cemented onto an abutment that is directly screwed to the implant and then, by drilling it lingually, the screw is accessed. It is then loosened, adapted, retouched, polished and reattached exclusively by screwing. In this way we guarantee a passive fit.

However, in cases of multiple implants, this becomes a little more complicated, and is normally worked with screw-retained prostheses on intermediate abutments, whose titanium cylinders are splinted intra-orally with titanium bars to prevent movement of the implants and to reinforce the structure of the prosthesis, which is normally made of resin.

In Immediate Loading processes (the implants are not yet osseointegrated), the fact that there should not be micro-movements of the implants that go beyond 150 microns if we do not want to compromise the osseointegration is sufficiently described in the literature.

The simplest and most reliable technique to avoid these movements is to join the implants as rigidly as possible by welding the screw-retained cylinders onto the intermediate abutments intraorally with small titanium bars.

These titanium bars are fused to the cylinders by a very localized electrical process and totally safe for the patient and the professional (syncrystallization)

This technique of joining the cylinders with welded titanium is not strictly necessary, but it is highly recommended, especially if we are doing immediate loading and if the distance between the implants is important, to avoid micro-movements, and to minimize the loads around the emergence of the implant, contributing to the maturation and shaping of the soft tissues and the adjacent bone.

In case that the implants are joined only by resin, which is more flexible, there will be a greater possibility of micro-movements affecting the implants, and also on the other hand there will be a greater probability of fracture and consequent failure of the entire immediate loading system.

Once the titanium bar has been splinted with the incorporated cylinders, these are screwed onto the intermediate abutments, the chimneys are covered with Teflon, and then the prefabricated resin prosthesis is placed, which has been previously hollowed out so that the titanium bar can enter it.

We have two options here:
1. Long Cylinder Technique: Consists of making the cylinder chimneys emerge through the prosthesis so that we can access the screws and loosen them. This technique has the disadvantage that the drilling of the prosthesis has to be done in a very approximate way, by eye, so the destruction will be important, and often the titanium tubes of the cylinders that emerge will compromise the aesthetics
2. 2. Short Cylinder Technique: The cylinders are covered by the resin, they do not emerge and we will be forced to look for the chimneys in order to access the screws and release the prosthesis. This second technique is very easy when dealing with short bridges, but very complicated in full arches, as the divergence of the implants makes it not at all easy to find the chimneys corresponding to each one of them.

The invention solves this problem and greatly facilitates immediate loading procedures in multiple cases, thanks to the cylinder assembly and the clip-on device.

At the same time, it also serves to retain full arch structures without the need for screwing or cementing, as detailed in the explanation of the invention.

EXPLANATION OF THE INVENTION

The present invention opens a new path in the techniques of making prosthesis on dental implants: the retention of the prosthesis by clip over an intermediate abutment, turning the intermediate abutment into a retention abutment, since the new cylinder presenting the invention can be screwed from above but also retained by clip from below.

The invention facilitates and considerably improves the current procedures of immediate loading in multiple cases, thanks to the cylinder assembly and the clip fastening device, and also serves to retain full arch structures without the need for screwing or cementing.

This is a huge advantage in both temporary and permanent prostheses, as it allows the patient to be able to remove, clean and replace it.

It would be something like a fixed-removable prosthesis, i.e. it would be like a fixed prosthesis but it can be easily removed. This type of prosthesis is ideal in the transitional phase, until the patient is completely at ease with it.

Therefore, the same prosthesis can be screwed on in a classic way, or retained by friction-clip. It is sufficient to replace the screws with the invented device; this applies to each of the cylinders that make up the prosthesis individually and independently.

In this way it is also possible to alternate screwed and clip retained implants, mixing in the same structure screwed cylinders with others retained by that clip device at convenience.

Example: If we have a full arch restoration with six implants, three can be screwed in and three retained by clips, precisely those with unfavorable emergencies that will normally be in the anterior sector. Or four screwed and two retained per clip, etc. All combinations are possible and all of them remain open at the same time.

The invention can be used for prosthesis made in resin but, thanks to a cementing base whose internal characteristics are the same as those of the cylinder (cone and concavity), it can also be used in fixed prosthesis, e.g. zirconium or ceramo-metallic structures.

Another advantage of the invention is the possibility of taking impressions with copings or transfers only retained by the clip (FIG. 27), without being screwed. This facilitates the impression taking, since the placement in the mouth of the same (by clip) is almost instantaneous, and the removal, even easier. Likewise, the tray for this purpose will be closed, which makes the task much easier.

The invention is a system composed of several parts:
1. A cylinder (FIGS. 1 and 2)
2. A cementing base (FIG. 5).
3. A clip fixing device (FIG. 3).
4. A fixing screw (FIG. 4)
5. An intermediate abutment on the implant (FIG. 6).

Each piece is detailed below:

1.—The special cylinder (part that goes on the intermediate pillar) (FIG. 1) has a double housing, which allows it to be screwed from above or retained by friction-clip from below.

This cylinder therefore has two different housings, one conical in its upper part (1 c) to seat the fixing screw, also conical, and the other in its lower part in the form of a concave ring (1 b) where the ball of the clip-on device will be housed.

2.—The cementing base (FIG. 5) with the same characteristics mentioned above for the cylinder, has the same upper conical lodgings (1c) in the lower concave ring (1b), and serves to replace the cylinder in the cases of zirconium or ceramic-metal prostheses, and in its preferential and not exclusive execution, it has some retention grooves for the cement (5 a).

3.—The clip fixing device (FIG. 3) consists of a convex ring in its upper part (3a) and a thread in the lower part (8b), which is screwed to the intermediate abutment (FIG. 6), taking up the space normally intended for the fixing screw (FIG. 4) and used instead to retain the prosthesis by friction-clip. The convexity of the clip fixture (3a) is housed in the concavity of the cylinder (1b) forming a concave-convex ring. The head of the clip-on fixture has the female imprint of the screwdriver (8a) inside, which enables it to be screwed and unscrewed onto the intermediate abutment (FIG. 8).

4.—The fixing screw (FIG. 4) has a seating cone (4a) which will be seated on the cylinder cone (1c).

5.—The intermediate abutment that goes on the implant (FIG. 6) has an internal thread (6a) in which the clip-on fixture (FIG. 3) is placed, as well as the fixation screw (FIG. 4). This abutment can be made in different heights depending on the gingival height in relation to the implant.

This intermediate abutment has a female screwdriver impression (6b) with which it can be screwed by means of a thread (6d) onto the implant, generating friction on the implant thanks to the conical wall (6c).

The great advantage of the system is that each cylinder or cement base of the prosthesis can be screwed or retained by clip, individually and independently, at convenience, within the same prosthesis, always maintaining both options.

For example, we can screw the implants that have favorable emergencies and only leave retained by clip those that do not meet these conditions, and this in a temporary or definitive way.

The cylinder can rotate 360 degrees around the clip-on device, since it is a double concave-convex ring. This allows us to look for angled accesses in case the axial access compromises the aesthetics of the dental prosthesis.

In this preferential and not exclusive realization, the fixation device can be manufactured in peek and its function is to retain the cylinders on the abutments without having to be screwed.

The retention by clip provided by the invention allows us, in the technique of the short cylinders, to remove the overshot prosthesis of the mouth without having to look for the chimneys, since it will be only retained by clip facilitating enormously the clinical process.

Once out of the mouth, with the prosthesis removed, searching for the chimneys to access the screw is much easier, as it is sufficient to position the cylinders one by one on an analogue to which a clip-on device has been previously threaded to visualize the shaft and mill accordingly to access the screw.

All of the above for the cylinder is equally valid for the cementing base if the prostheses are made of zirconium or ceramo-metallic.

It should be noted that this retention system is valid for any type of implant system on the market, modifying the cylinders and, where appropriate, the abutments according to the design of the implant chosen.

The new conical seat of the screw (4a) on the cylinder or the cementing base (1c) allows for better distribution of the stress related to the prosthetic loads. This fact, together with the friction provided by the two cones, makes the system much more stable in the long term, preventing loosening.

Another advantage of the invention consists in the possibility of making both the cylinder and the cementing base in a short version, with a reduced height (FIG. 23 and FIG. 25) in which both only contain the circumferential concavity in the form of a ring and the cone is eliminated, making them shorter and closed at the top, as capsules (FIG. 23) and (FIG. 25). This eliminates the possibility of screwing and the system is now only clip-on, but always using the clip-on device as the only means of retention (FIGS. 24 and 26). This possibility is helpful in cases of low prosthetic height.

The external shapes of these capsules can be multiple, with a greater or lesser degree of convergence of the walls, depending on the prosthetic functionality and keeping the inside of the capsules the same.

BRIEF DESCRIPTION OF THE DRAWINGS

To complement the description that is being made, and in order to help a better understanding of the characteristics of the invention in its preferential and not exclusive realization, it is accompanied as an integral part of that description, a set of drawings where with illustrative and not restrictive character, the following has been represented FIG. 1.—Sectional cut of the cylinder
   1a.—Retention slots for the resin or cement (optional).
   1b.—Concave ring-shaped housing of the clip-on device
   1c.—Conical housing of the fixing screw.

1*d*. lower housing.

Figure 6:
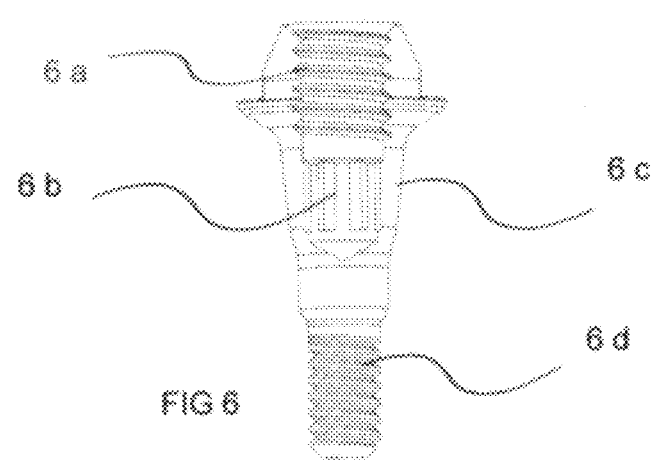

FIG. 6.—Intermediate abutment on implant.

6*a*.—Internal thread for clip or screw fixation device.

6*b*.—Female screwdriver footprint.

6*c*.—Conical wall that sits on the corresponding cone of the implant.

Figure 7:
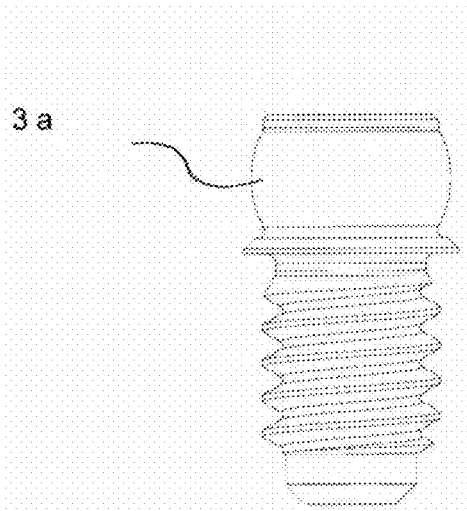

FIG. 7.—External view of the clip-on device.

3*a*.—Circumferential convexity in the form of a ring which is housed in 1 *b*.

Figure 8:
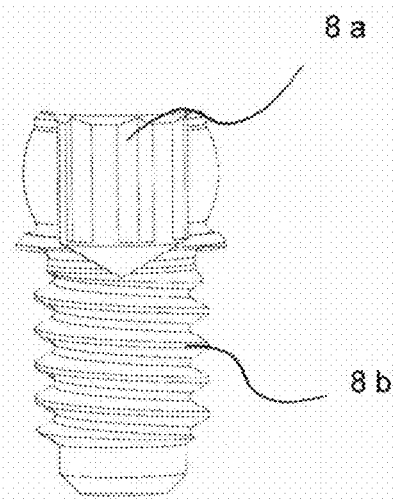

FIG. 8.—Sectional cut of the clip-on device.

8*a*.—Screwdriver's female footprint.

8*b*.—Fixation thread on the intermediate abutment that goes over the implant.

Figure 9:
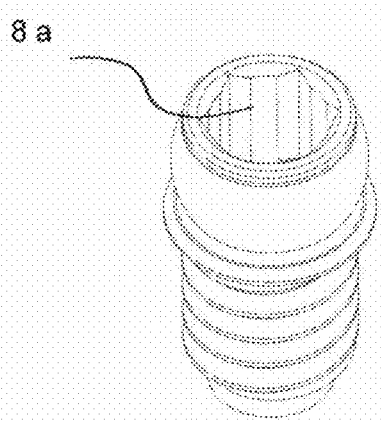
Figure 10:
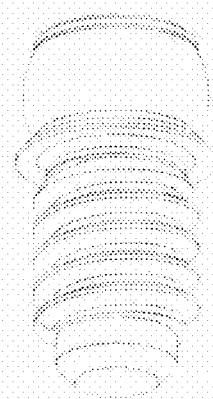
Figure 11:
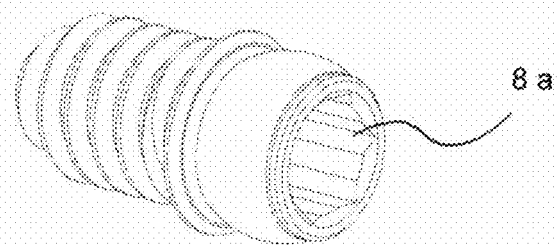

FIGS. 9, 10 and 11.—Different perspectives of the clip-on device

Figure 12:
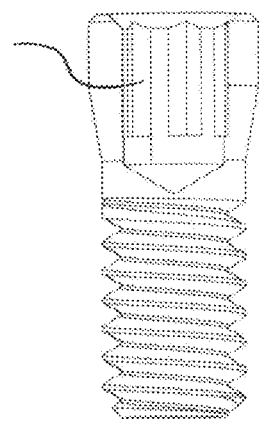

FIG. 12.—Sectional cut of the fixing screw

12*a*.—Female screwdriver housing.

Figure 13:
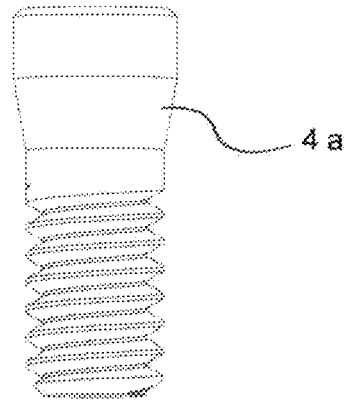

FIG. 13. External view of fixing screw.

4*a*.—Conical seat of the fixing screw

Figure 14:
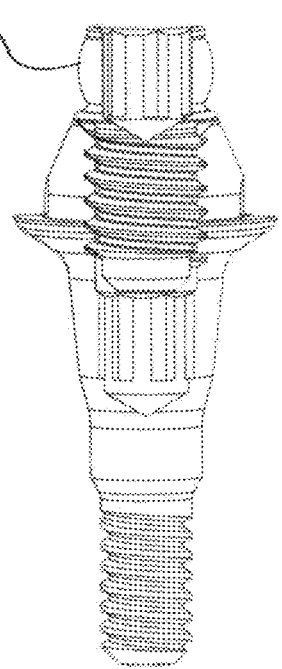

FIG. 14.—Sectional view of the assembly abutment—clip-on device.

3*a*.—Circumferential convexity in the form of a ring which is housed in 1 *b*.

Figure 15:
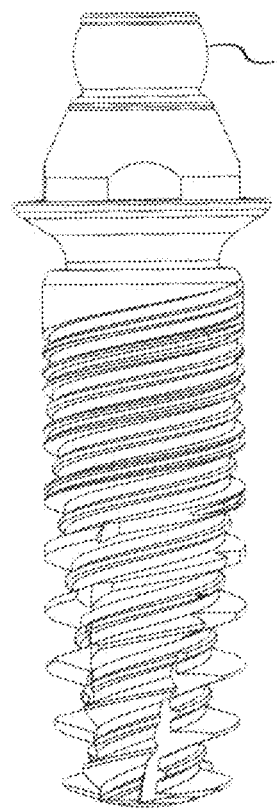

FIG. 15.—External view of the implant assembly (not claimed in the invention) with the intermediate abutment and the built-in clip-on device.

3*a*.—Circumferential convexity in the form of a ring which is housed in 1 *b*.

Figure 16:
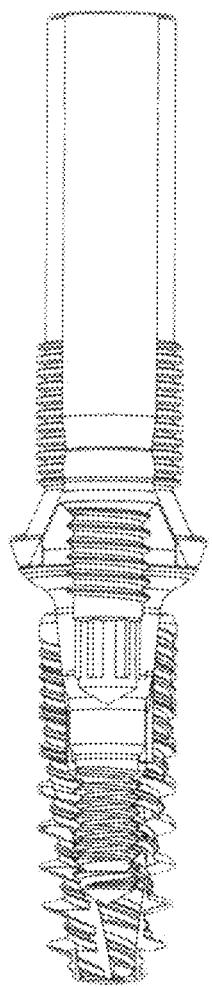

FIG. 16.—Section of the implant assembly (not claimed in the invention), with intermediate abutment and cylinder, without clip or screw fixing device.

Figure 17:
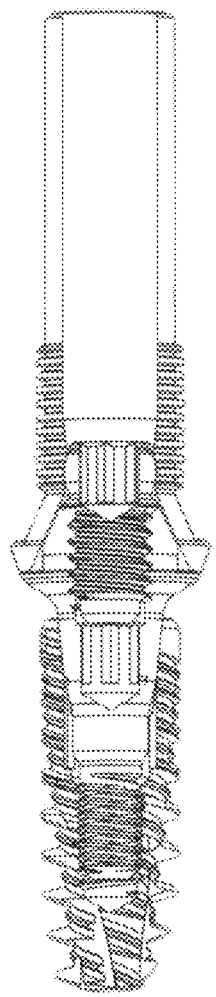

FIG. 17.—Section of the implant assembly (not claimed in the invention), with intermediate abutment and cylinder, with a clip fixing device.

Figure 18:
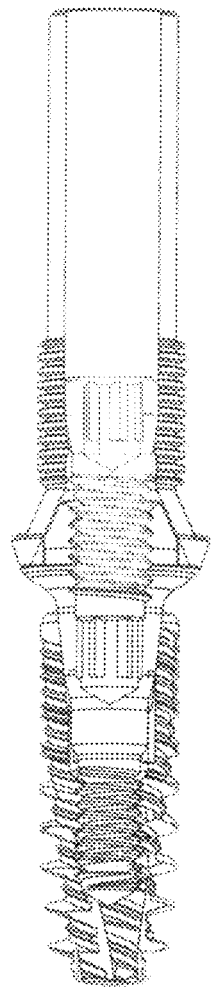

FIG. 18.—Section of the implant assembly (not claimed in the invention), with intermediate abutment and cylinder, with fixing screw.

Figure 19:
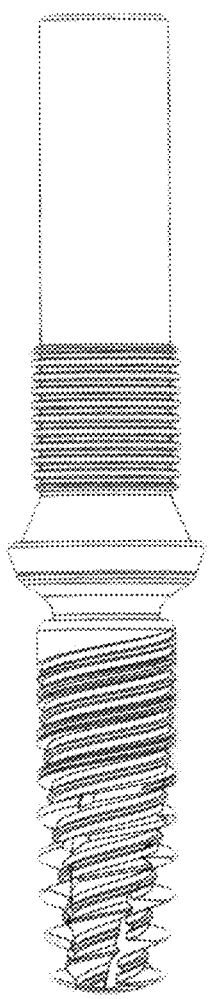

FIG. 19.—External view of the assembly

FIG. 20.—Section of the assembly, intermediate abutment clip fixing device with the cement base to be inserted.

FIG. 21.—Section of the assembly intermediate abutment, clip-on device with the cementing base inserted.

FIG. 22.—Section of the assembly intermediate abutment, with the cementing base inserted and tightened by means of the fixing screw.

Figure 5:
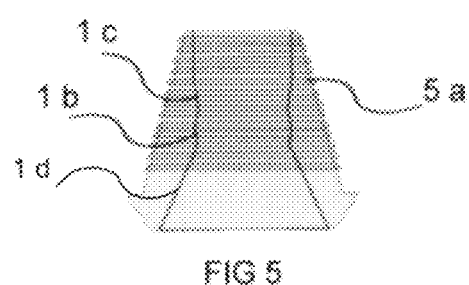
FIG. 5.—Cementation base for zirconium or ceramic-metal prostheses
   5a.—Retention slots for cement (optional).
   1b.—Concave ring shaped lodging of the clip fixing device
   1c.—Conical screw housing.
Figure 23:
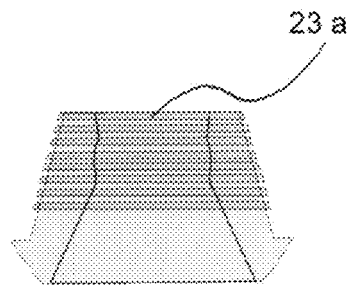

FIG. 23.—Capsule-cementing base with height cut off from the standard represented in FIG. 5.

Figure 24:
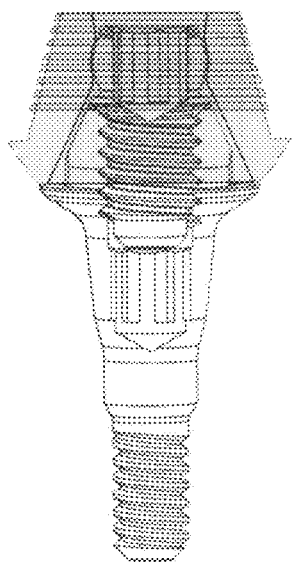

FIG. 24.—Section of the assembly intermediate abutment with threaded clip attachment device on it and cementing capsule-base retained by clip.

Figure 1:
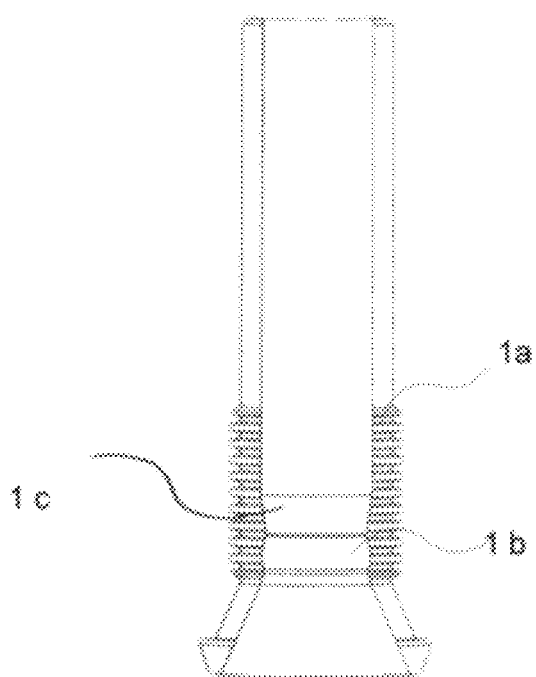
Figure 2:
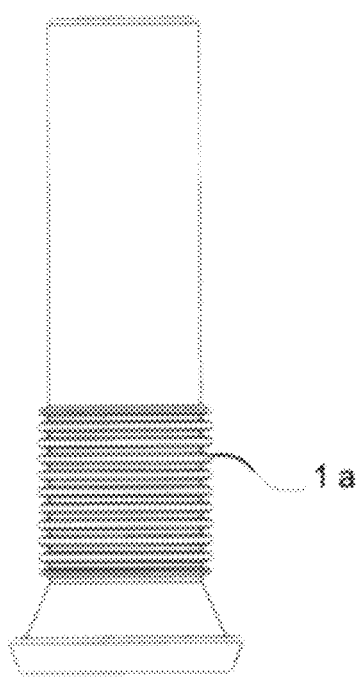
FIG. 2.—Cylinder external view
FIG. 3.—Sectional cut of the clip-on device.
   3a.—Circumferential convexity in the form of a ring which is housed in 1b.
Figure 25:
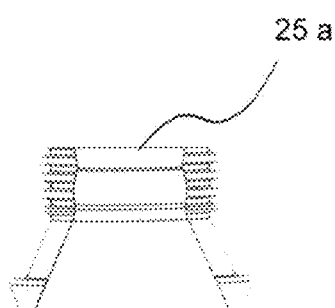

FIG. 25.—Section of the capsule-cylinder cut out from the standard one shown in FIG. 1.

Figure 26:
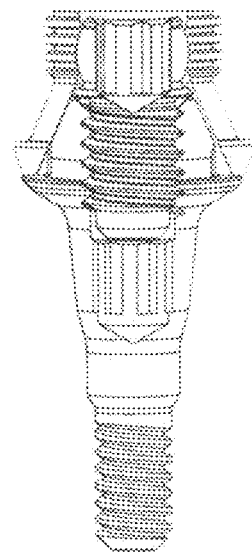

FIG. 26.—Section of the intermediate pillar-clip and capsule-cylinder assembly.

Figure 27:
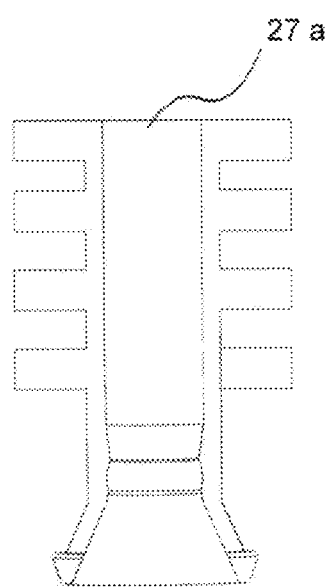

FIG. 27.—Clip-on print transfer or coping, closed at the top (FIG. 27*a*) that can be used with a closed tray and dragged in the measure.

Figure 28:
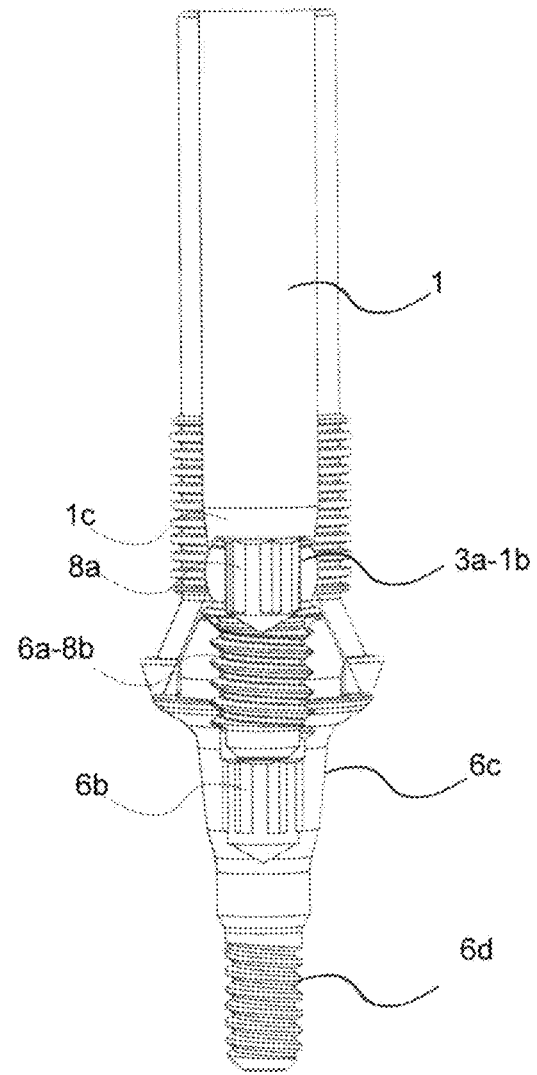

FIG. 28.—Section of the system formed by an intermediate pillar with a clip fastening device and a cylinder, both incorporated.

PREFERENTIAL IMPLEMENTATION OF THE INVENTION

In addition to what is already specified in the drawings and in the previous section of the description as the preferential and not exclusive realization of the invention, various materials can be used to manufacture the system.

The male device that is threaded on the intermediate pillar can be manufactured in Peek. This material provides it with a high resistance to abrasion as well as the necessary flexibility for the clip effect. The material also allows for high precision machining. Based on this machining precision, and by changing the tolerances, we can obtain different degrees of retention and for this purpose a colour code can be established to indicate the degree of retention.

Figure 3:
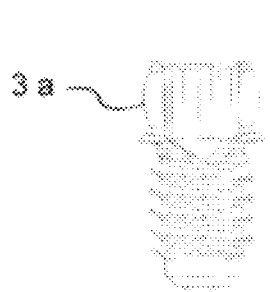
Figure 4:
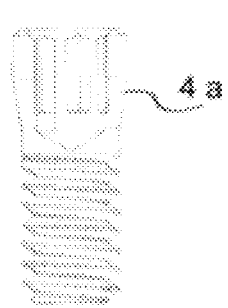
FIG. 4.—Sectional section of the conical seat fixing screw.
   4a.—Conical seat of the fixing screw.

Another manufacturing alternative would be to make the male of the clip fixture (FIG. 3) in titanium instead of peek, and consequently make the capsule in peek instead of titanium. None of these possibilities or materials are exclusive to others.

Both the cylinder and the cementing base can be made of various materials, such as titanium, gold-palladium, peek and equivalent, without these materials being exclusive or necessary for the realization of the invention.

The invention claimed is:

1. A dual fixation system for receiving a prosthesis on a dental implant that allows the prosthesis to be screwed or retained by clip as appropriate, said system comprises:
    an intermediate abutment configured to be received on the dental implant, the intermediate abutment including an internal thread;
    a cylinder configured to be received on the intermediate abutment, the cylinder having a retention area, the retention area including an upper housing, a lower housing and a middle housing, the upper housing having a conical internal surface and is configured to seat a fixing screw, the lower housing having a conical internal surface and is configured to seat a head of the intermediate abutment, the middle housing having an internal surface which is a concave ring and is configured to receive a clip fixing device;
    the fixing screw having a cone, the cone removably being seated in the upper housing; and
    the clip fixing device having a convex ring in an upper part of the clip fixing device and a thread in a lower part of the clip fixing device, the convex ring of the clip fixing device removably being received in the concave ring of the middle housing;
    wherein the fixing screw and the clip fixing device are interchangeably removably coupled to the internal thread of the intermediate abutment, so the use of one excludes the other.

2. A method for fixing a prosthesis on a dental implant in a dual form, either by screw or by clip, according to the convenience of the user dentist, both on an intermediate abutment, between the implant and the prosthesis, where said method comprises the steps of:
    placing a cylinder on the intermediate abutment, the cylinder having a retention area, the retention area including an upper housing a lower housing and a middle housing, the upper housing having a conical internal surface the lower housing having a conical internal surface and the middle housing having an internal surface which is a concave ring;
    seating a fixing screw in the upper housing seating a head of the intermediate abutment in the lower housing, the fixing screw having a cone, the cone being seated in the upper housing and being coupled to an internal thread of the intermediate abutment or
    seating a clip fixing device in the middle housing, the clip fixing device having a lower housing which is conical, a convex ring in an upper part of the clip fixing device and a thread in a lower part of the clip fixing device, the convex ring of the clip fixing device being seated in the concave ring of the middle housing and the thread of the clip fixing device being coupled to an internal thread of the intermediate abutment; the cylinder is retained on the intermediate abutment without having to be screwed.

3. The dual fixation system according to claim 1, wherein the cylinder has a:

short cylinder shape;

base form; or long cylinder shape.

4. The dual fixation system according to claim 1, wherein the clip fixing device includes:

a female screwdriver housing in the convex ring of the clip fixing device at the top, the female screw driver housing configured to be screwed and unscrewed to attach the clip fixing device to the intermediate abutment.

5. The dual fixation system according to claim 1 wherein the clip fixing device being manufactured in PEEK, and the cylinder being manufactured in a metal.

6. The dual fixation system according to claim 1 wherein the clip fixing device being manufactured in metal and the cylinder being manufactured in Peek.

7. The dual fixation system according to claim 1, wherein the fixing screw tightens the upper housing of the cylinder against the intermediate abutment.

\* \* \* \* \*